United States Patent
Kimoto et al.

(10) Patent No.: US 7,423,099 B2
(45) Date of Patent: Sep. 9, 2008

(54) PROCESS FOR PRODUCING POLYOLEFIN

(75) Inventors: Hitoshi Kimoto, Sodegaura (JP); Ryouji Kanita, Kisarazu (JP); Yoichi Konno, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 23 days.

(21) Appl. No.: 11/539,901

(22) Filed: Oct. 10, 2006

(65) Prior Publication Data

US 2007/0106037 A1   May 10, 2007

(30) Foreign Application Priority Data

Oct. 12, 2005   (JP) .............................. 2005-297235

(51) Int. Cl.
 *C08F 2/34*   (2006.01)
 *C08F 2/12*   (2006.01)
 *C08F 110/06*  (2006.01)

(52) U.S. Cl. ............................. 526/65; 526/88; 526/352; 526/901

(58) Field of Classification Search ................... 526/65, 526/66, 901, 88, 352; 525/53
See application file for complete search history.

(56) References Cited

U.S. PATENT DOCUMENTS 4,187,278 A * 2/1980 Clifford ...................... 422/132
6,455,643 B1 * 9/2002 Harlin et al. .................. 526/65

* cited by examiner

*Primary Examiner*—Fred M Teskin
(74) *Attorney, Agent, or Firm*—Sughrue Mion, PLLC

(57) ABSTRACT

A process for producing a polyolefin comprising a combination of liquid phase polymerization of α-olefin conducted in one or more liquid phase polymerization reactors and gas phase polymerization of α-olefin conducted in one or more gas phase polymerization reactors after the liquid phase polymerization in a material flow.

5 Claims, No Drawings

PROCESS FOR PRODUCING POLYOLEFIN

BACKGROUND OF THE INVENTION

The present invention relates to a process for producing a polyolefin using gas phase polymerization in which the gas phase polymerization reaction of α-olefin can be smoothly started without using a seed powder.

Hitherto, it has been considered that in the production of polyolefin with a gas phase polymerization reactor using a fluidized bed, the polymerization reaction cannot be smoothly started unless the polymerization is started after a seed powder is previously filled in the gas phase polymerization reactor and fluidization is started, and then a raw material mixed gas, a catalyst and the like are fed to start the polymerization. Thus, the seed powder has necessarily been used, and hence particle diameter and particle size distribution for uniform dispersion of the fluidizing gas, and operation method and composition of the seed powder for realizing the uniform dispersion state have been investigated (see, for example, Patent Document 1 and Patent Document 2).

However, the seed powder used for formation of the fluidized bed must comprise those components which are the same as or similar to the product polyolefin, taking into consideration the fluidizing conditions and the influence on the quality of the product. Therefore, when many kinds of products are to be produced in the same plant, the polymer in the gas phase polymerization reactor must be wholly discharged for changing over of the kinds of products or for carrying out periodical repairing, and a fresh seed powder must be introduced into the gas phase polymerization reactor when the polymerization is restarted. Therefore, the number of operations and the time required for these operations cause problems. Thus, there has been demanded a method for starting the gas phase polymerization according to which the polymerization can be started more conveniently and smoothly.

[Patent Document 1] JP-A-6-1804 (pages 1-3)
[Patent Document 2] JP-A-2004-189961 (pages 1-3)

SUMMARY OF THE INVENTION

Under the circumstances, the object of the present invention is to provide a process for producing a polyolefin using gas phase polymerization in which the gas phase polymerization reaction of α-olefin can be smoothly started without using a seed powder.

That is, the present invention relates to a process for producing a polyolefin comprising a combination of liquid phase polymerization conducted in one or more liquid phase polymerization reactors and gas phase polymerization conducted in one or more gas phase polymerization reactors after the liquid phase polymerization in a material flow, the process comprising the following steps A through E:

step A: a step of polymerizing liquid α-olefin in the presence of a catalyst in a first reactor for liquid phase polymerization to produce a slurry comprising unreacted liquid α-olefin and a polymer powder containing the catalyst, step B: a step of causing gas comprising α-olefin to flow in a second reactor for gas phase polymerization while keeping the second reactor unfilled with a seed powder, step C: a step of transferring the slurry produced in the first reactor into the second reactor unfilled with a seed powder in which the gas comprising α-olefin is caused to flow, step D: a step of vaporizing the liquid α-olefin included in the slurry transferred from the first reactor, polymerizing the vaporized α-olefin and the α-olefin included in the gas blown into the second reactor, and forming a fluidized bed by fluidizing a polymer powder, this step being conducted in the second reactor in which the gas comprising the α-olefin is caused to flow, and step E: a step of bringing the temperature and the pressure in the second reactor to a temperature and a pressure high enough to polymerize the α-olefin in the second reactor while allowing the gas comprising the α-olefin to flow.

In the above process, it is a preferred embodiment to produce the polyolefin in the liquid phase polymerization in an amount of 2 to 50% by weight based on the amount of a polyolefin eventually produced through both the liquid phase polymerization and the gas phase polymerization.

Furthermore, it is a preferred embodiment that the liquid α-olefin in the step A is propylene or a mixture of propylene and at least one member selected from ethylene and 1-butene.

Moreover, it is a preferred embodiment that in the step C the gas is caused to flow in the second reactor at a velocity of 0.10 to 0.30 m/sec.

It is a particularly useful embodiment that the α-olefin in the gas which is caused to flow in the second reactor in steps B, C, D and E is propylene or a mixture of propylene and at least one member selected from ethylene and 1-butene.

According to the present invention, it has become possible to provide a process for producing a polyolefin in which there is no need to form a fluidized bed of a seed powder in the gas phase polymerization reactor prior to the starting of gas phase polymerization in the gas phase polymerization reactor, the polymer produced does not agglomerate or melt to become a mass, and thus the polymerization can be started smoothly.

DETAILED DESCRIPTION OF THE INVENTION

The step A in the present invention is a step of conducting polymerization of liquid α-olefins, for example, propylene or a mixture of propylene and one or two members selected from ethylene and 1-butene, namely, a mixture of propylene and ethylene, a mixture of propylene and 1-butene or a mixture of propylene, ethylene and 1-butene. As the liquid phase polymerization reactor, there may be used either a polymerization reactor of vessel type and a polymerization reactor of loop type. In the present invention, the liquid phase polymerization reactor provided just before the gas phase polymerization reactor is called a first polymerization reactor. As the catalyst, there may be ordinarily used a Ziegler catalyst comprising a transition metal compound and an organoaluminum compound, or the like. The liquid phase polymerization is conducted with setting the polymerization temperature (temperature of liquid phase) at 50-70° C. and the pressure of the gas phase portion in the liquid phase polymerization reactor at 3-5 MPa. For control of polymerization reactivity, hydrogen can further be introduced into the liquid phase polymerization system. Preferably, the polyolefin is produced in the liquid phase polymerization in advance of the gas phase polymerization in an amount of 2 to 50% by weight based on the amount of a polyolefin eventually produced through both the liquid phase polymerization and the gas phase polymerization.

The step B is a step of causing gas comprising α-olefin to flow in a second reactor for gas phase polymerization while keeping the second reactor unfilled with a seed powder. In this step, it is preferred to keep the velocity of said gas in the range of 0.10 to 0.30 m/sec in the second reactor. Furthermore, it is preferred to keep the temperature of the gas phase in the range of 40-80° C., and the pressure of the gas phase in the range of 300-2000 kPa. Particularly, it is preferred that the velocity of the gas and the temperature and pressure of the gas phase are kept at lower than those in so-called steady state at which the gas phase polymerization system in the second reactor arrives later. The gas comprising α-olefin may comprise only α-olefin or a mixture of α-olefin and hydrogen. The gas is blown into the second reactor from a gas feed opening provided at the reactor and is caused to flow through the reactor, and discharged from a gas discharge opening provided at the reactor. The discharged gas can be circulated by again causing the gas to flow into the second reactor through an outer line which may be provided with a compressor or the like.

The step C is a step of transferring the slurry produced in the first reactor into the second reactor unfilled with a seed powder in which the gas comprising α-olefin is allowed to flow. The transfer of the slurry may be carried out continuously or intermittently. The slurry transferred and fed into the second reactor comprises unreacted liquid α-olefin and a polymer powder containing the catalyst used in the first reactor as mentioned above.

In the transfer of the slurry, the gas containing α-olefin is caused to flow in the second reactor, and the flow rate (velocity) of the gas is preferably 0.10-0.30 m/sec as in the step B. Moreover, it is preferred to keep the temperature in the range of 40-80° C., and the pressure in the range of 300-2000 kPa. Particularly, it is preferred to keep the velocity of the gas and the temperature and pressure of the gas phase at lower than those in so-called steady state at which the gas phase polymerization system in the second reactor arrives later.

Since the pressure in the second reactor is lower than the pressure in the first reactor, the slurry transferred from the first reactor and introduced into the second reactor is flushed to cause vaporization of the liquid α-olefin contained in the slurry, and the polymer powder comprising catalyst is fluidized by the action of the gas flowing in the reactor and begins to form a fluidized bed.

The step D is a step of vaporizing the liquid α-olefin included in the slurry transferred from the first reactor, polymerizing the vaporized α-olefin and the α-olefin included in the gas blown into the second reactor, and forming a fluidized bed by fluidizing a polymer powder, this step being conducted in the second reactor in which the gas comprising the α-olefin is caused to flow.

In and around the polymer powder comprising catalyst included in the slurry transferred in the step C, polymerization reaction of α-olefin proceeds to produce a grown polyolefin powder, which is fluidized by the action of the gas allowed to flow in the second reactor to begin to form a fluidized bed. Since the amount of the polymer powder in the second reactor at the initial stage in this step is small, it is preferred as in the step B to keep the flow rate (velocity) of the gas in the range of 0.10-0.30 m/sec, and, moreover, the temperature in the range of 40-80° C., and the pressure in the range of 300-2000 kPa. Particularly, it is preferred to keep the velocity of gas and the temperature and pressure of the gas phase at lower than those in so-called steady state at which the gas phase polymerization system in the second reactor arrives later. By keeping the velocity, the temperature and the pressure at the values lower than those in the steady state, polymerization and formation of fluidized bed can be stably started in the second reactor.

The step E is a step of bringing the temperature and the pressure in the second reactor to a temperature and a pressure high enough to polymerize the α-olefin in the second reactor while allowing the gas comprising the α-olefin to flow. That is, while forming a fluidized bed or after forming the fluidized bed in the second reactor, the flow rate and pressure of the gas are gradually adjusted to a given flow rate and a given pressure, and upon completion of raising of the pressure, the temperature is raised to a given polymerization temperature.

When the amount of the polyolefin powder retained in the second reactor reaches the specified amount, extraction of the polyolefin powder from the second reactor is started and the powder is transferred to the next step, whereby the inside of the second reactor is in the so-called steady state.

If necessary, an additional reactor may be provided upstream the first reactor where liquid polymerization is conducted, and liquid polymerization of α-olefin can be conducted in the additional reactor. The slurry produced in this reactor on the upstream side is transferred into the first reactor and the above liquid polymerization is conducted in the first reactor.

After the fluidized bed is once formed in the second reactor and the inside of the reactor arrives at the so-called steady state, continuous or intermittent transfer of the slurry from the first reactor to the second reactor, and supply of the gas containing α-olefin to the second reactor are continued, whereby the gas phase polymerization is continued and thus polyolefin can be produced. Furthermore, if necessary, the polyolefin powder produced in the second reactor is transferred into a reactor provided on the downstream side of the second reactor, and in this reactor the gas phase polymerization of α-olefin is further conducted and thus polyolefin can be produced.

EXAMPLE

The following example will further illustrate the present invention, which should not be construed as limiting the invention in any manner.

Example 1

Gas phase polymerization was carried out in the following manner using a loop type liquid phase polymerization reactor and a fluidized bed type gas phase polymerization reactor having a volume of 46 m$^3$ and a diameter of right cylinder part of 2.0 m.

Liquid propylene and a catalyst were continuously introduced into the loop type liquid phase polymerization reactor, and liquid phase polymerization was carried out so that the amount of the polymer produced was about 5 wt % based on the amount of the final polymer. On the other hand, the gas phase polymerization reactor in the state of being unfilled with seed powder was kept at a temperature of 65° C. and a pressure of 500 kPa, and propylene gas was circulated at 0.13 m/sec by a circulation gas blower. When polypropylene powder produced in the liquid phase polymerization reactor and unreacted propylene were intermittently fed to the gas phase polymerization reactor, the reaction in the gas phase polymerization reactor proceeded and the polypropylene powder began to grow due to further polymerization in the reactor, and hence the pressure was gradually raised to 1500 kPa. After completion of raising of pressure, the temperature was raised to 75° C., and after the amount of polypropylene powder retained in the gas phase polymerization reactor reached the specified 2.5 tons, extraction and transfer to the next polymerization step were started to bring the reactor to steady state. During the above procedure, the formation of fluidized bed was smoothly performed in the gas phase polymerization reactor and no massive resin was produced.

The invention claimed is:
1. A process for producing a polyolefin comprising a combination of liquid phase polymerization of α-olefin conducted in one or more liquid phase polymerization reactors and gas phase polymerization of α-olefin conducted in one or more gas phase polymerization reactors after the liquid phase polymerization in a material flow, the process comprising:

step A of polymerizing liquid α-olefin in the presence of a catalyst in a first reactor for liquid phase polymerization to produce a slurry comprising unreacted liquid α-olefin and a polymer powder containing the catalyst, step B of causing gas comprising α-olefin to flow in a second reactor for gas phase polymerization while keeping the second reactor unfilled with a seed powder, step C of transferring the slurry produced in the first reactor into the second reactor unfilled with a seed powder in which the gas comprising α-olefin is caused to flow, step D of vaporizing the liquid α-olefin included in the slurry transferred from the first reactor, polymerizing the vaporized α-olefin and the α-olefin included in the gas blown into the second reactor, and forming a fluidized bed by fluidizing a polymer powder, this step being conducted in the second reactor in which the gas comprising the α-olefin is caused to flow, and step E of bringing the temperature and the pressure in the second reactor to a temperature and a pressure high enough to polymerize the α-olefin in the second reactor while allowing the gas comprising the α-olefin to flow.

2. The process according to claim 1, wherein a polyolefin is produced in the liquid phase polymerization in an amount of 2 to 50% by weight based on the amount of a polyolefin eventually produced through both the liquid phase polymerization and the gas phase polymerization.

3. The process according to claim 2, wherein in the step C the gas is caused to flow in the second reactor at a velocity of 0.10 to 0.30 m/sec.

4. The process according to claim 1, wherein the liquid α-olefin in step A is propylene or a mixture of propylene and at least one member selected from ethylene and 1-butene.

5. The process according to claim 1, wherein the α-olefin in the gas which is caused to flow in the second reactor in steps B, C, D and E is propylene or a mixture of propylene and at least one member selected from ethylene and 1-butene.

* * * * *